Figure 1:
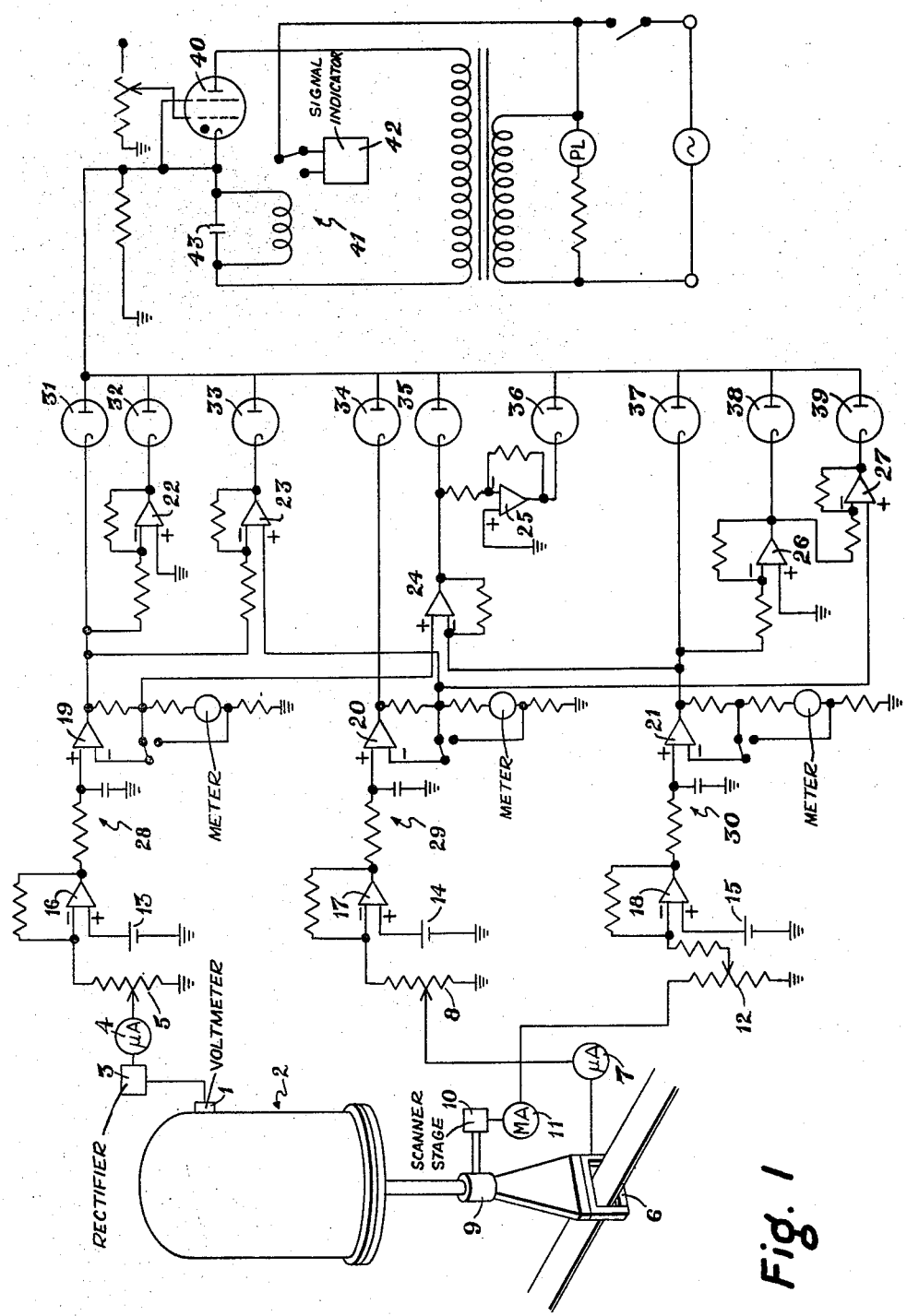

Oct. 18, 1960  A. J. GALE  2,957,078
ELECTRON BEAM DOSAGE MONITORING
Filed Jan. 2, 1957

United States Patent Office 2,957,078
Patented Oct. 18, 1960

2,957,078

ELECTRON BEAM DOSAGE MONITORING

Alfred J. Gale, Lexington, Mass., assignor to High Voltage Engineering Corporation, Burlington, Mass., a corporation of Massachusetts Filed Jan. 2, 1957, Ser. No. 632,109

6 Claims. (Cl. 250—49.5)

This invention relates to electron irradiation, and in particular to a novel monitoring method and apparatus in which the dosage of ionizing radiation received by the material being irradiated with electrons is monitored by measuring the electron beam generator parameters and determining whether they deviate from a prescribed margin. The three parameters are (1) beam current, (2) beam energy, (3) beam distribution. In a preferred form of the invention, the electron beam generator comprises an electrostatic accelerator the electron beam from which is scanned lineally, so that beam energy and beam distribution may be measured, not from the electron beam itself, but from the voltage of the generator and from the peak current in the scanning coils which produce the oscillatory magnetic field through which the electron beam passes, respectively. However, the invention is not limited to such an electron beam generator, but includes other generators, such as microwave linear accelerators, resonant transformers and cascaded rectifier sets; nor is the invention limited to lineally scanned beams, but includes sinusoidally and otherwise scanned beams as well as unscanned beams.

The electron beam is today finding increasing use as a processing tool in an ever increasing number of fields. Each new user in each new field needs to know what dose his product is receiving. Consequently, the equipment supplier must provide more than merely the electron beam, and must at least suggest methods of showing whether the electron beam is being used effectively and correctly.

The accuracy required in monitoring product treatment varies in the various fields of use. In the chemical field, there are many examples where only the average dose over a relatively long period is important; but at the other end of the scale, for food and particularly for drugs sterilization, the dose being received by the product must be continuously known and monitored.

Therefore, it is to be pharmaceutical field we turn to find the most stringent conditions under which the electron beam equipments will be used.

In this field, there have been many methods employed to achieve sterility in the final product; but by far the most important of them has been heat coupled with aseptic conditions in the product preparation. The raising of the product temperature and holding it there for a certain period to destroy the few microorganisms that may exist after the asceptic preparation is essentially a batch process. Large numbers of units are held in an autoclave for sufficient time, and from previous experience the product is known to be sterile. The process is monitored by measuring the temperature and time, and recording these details. Even more important, however, is the possibility of extracting a few samples from the batch and testing them individually for sterility with the knowledege that the results shown in these samples will hold for the total batch of material.

The first change existent in transferring from heat sterilization techniques to those of the electron beam is in going from a batch sterilization process to a continuous and, therefore, individual sterilization process. We now need to know what each unit has received individually and not what a few out of a group of a thousand or more units have received.

This charge does not necessarily apply in the case of gamma irradiation by isotopes since the batch process can be adhered to; so that there is a difference in concept between the monitoring methods which must be applied to electron beams and those which could be applied to isotope irradiations. The dose required for sterilization has an upper limit of about 1.7 megarad. This defines in conjunction with the power output of the machine the rate of flow of product underneath beam. More particularly, since the thickness of a product that can be treated is proportional to the beam energy, the dose required by the product, taken in conjunction with the current output of the machine, defines the rate of a real flow of product underneath the beam. For a 10-kilowatt machine, this flow rate is about 33-square feet per minute; if we are designing for a 20-kilowatt machine, and a product width of about one foot, then the conveyor speed will be nearly 70 feet per minute. If lower doses than 1.7 megarad are adequate, as in de-infestation, then very much higher conveyors speeds will be required if the equipment is to be used economically.

Apart from economic considerations, excessive dose generally leads to some unwanted side effects which may include the degradation of the final product itself.

At these high conveyor speeds an individual package exists underneath the beam only for a fraction of a second and yet we must determine whether in that fraction of a second that package, as well as all the others, received a sterilizing dose. This, then, is the context in which an electron-beam dose-monitoring system must operate.

The first important factor determining whether a product has been correctly treated is the dose it has received, and before a sterilization process is put into production a large number of samples would have been made and each unit destructively analyzed to determine the dose required and the margins which should be set on this dose. These margins will be established by the incidence of unwanted side effects and, secondarily, by economic considerations. This initial sampling will not necessarily be run on a machine identical with that to be used in the production process and we see immediately, there is a need for dosimetry which can record information obtained on one machine to enable the correct settings to be achieved on another. Quite elaborate arrangements can be made here since time is not of the essence. Dosimetry for thus function forms no part of the present invention.

In principle, a dose indicator could be put with each unit being sterilized. However, even a good one would probably suffer from the drawbacks that it is more expensive than the treatment by the electron beam itself, and that the problem of reading out the dose and recording it would be still more expensive and, unless done by fully automatic means, subject to human errors. Even if all these difficulties were overcome, the dose in the indicator would have been established, but it would have to be considered whether the geometry of the system (that is, the location of the indicator relative to the unit and its size) taken in relation to all conceivable short-time variations in the electron beam equipment, also ensures that the product has received this same dose.

A variant on this theme would be to run an indicator strip underneath the beam at the same time as the product. If the problem of keeping correlation between the indicator strip and the product it represents is neglected as being the problem of the processor and not that of the electron beam equipment or systems supplier, there are nevertheless some others which must be faced.

First, it must be determined to what accuracy in time the indicator should be resolved. This in turn depends upon the electron beam machine parameters. In the case of a lineally scanned beam machine, a spot which is about one centimeter or ⅜-inch diameter is scanned lineally back and forth over the width of the conveyor at, in this example, a frequency of 200-cycles per second. As the electron beam is swept back and forth, the trace at the surface of the product overlaps many others. In the case of a half-kilowatt machine, the conveyor belt is moving forward at only 40-inches per minute, or about two spot widths per second. If the dose margin is set at 10%, ½₀ of a second of the output of the machine can be lost without the dose at the surface of the product dropping below the prescribed amount. Thus, when our indicator tape is read off, the time resolution of such reading must be about ½₀ second and the indicator tape must be read to an accuracy of considerably better than 10%. This is obviously too difficult for personal inspection and automatic methods must, therefore, be used.

Again the question of geometry must be brought into this picture. A single narrow tape will not indicate what is going on in other parts of the product and a tape above the product does not necessarily show that the electron beam has adequate penetration. The minimum number of tapes that we can use would be three; or, alternatively, we could use three reading points on two tapes—one above and one below the product. Even here it would be extremely difficult to prove that the three reading points did, in fact, indicate reasonable certainty of uniformity of dose throughout the product.

The biggest difficulty of all, however, is that arising from the differences in electron reflection from the heterogeneous materials to be treated and the conveyor belts over which they run. This electron reflection varies both in energy and in current and is dependent upon the material which the electron beam strikes. For the light elements, which are mostly involved in food and drug systems, the reflection is relatively small—a few percent in terms of current and at most two percent in terms of total power. But the heavy elements reflect much more, and from these elements are usually made the conveyor belts (which under electron beam bombardment cannot be of organic material) and often the containers of the products. The current reflected from a stainless steel conveyor belt can be as high as 20% though the power returned is only about 4% because the return electrons have lost 80% of their energy. Thus, indicator tapes will be subject to varying amounts of reflection and it is conceivable that current reflected from the stainless steel conveyor belt in the gaps between adjacent products could mask a momentary reduction in output at the product.

So far, methods of measuring the dose have been discussed; but the original problem was whether the product is being correctly treated. Instead of finding out what dose the product has received it is possible to measure the dose being delivered instantaneously by the machine.

The first problem is that while it is not impossible to design ionization chambers for the 10 to 20-kilowatt region, it is nevertheless extremely difficult to do so since anything placed in the path of the beam without adequate cooling, which is often very elaborate, will very quickly reach a hazardous temperature. In addition, ionization chamber systems suffer from many of the drawbacks that we have pointed out in the indicator tape method.

First, at least three ionization chambers are necessary in order to read out the beam over the area and on both sides of the product and the varying amounts of the electron reflection will give rise to some uncertainty in the actual measurements. There is always some difficulty, anyway, in conceiving systems in which part of the indicator lies on the exit side of the product because it is usually supported by a metal conveyor; it is obviously wasteful to design a beam to go right through the metal conveyor to reach a dose indicator when all that is necessary is to sterilize the product.

As a result of the foregoing considerations, other avenues have been sought; and, in accordance with the invention, the dosage monitor determines whether the product is being incorrectly treated.

If a good job has been done, as it must, in determining the dose required by the product, then the various parameters which determine whether this dose is being received by the product on the production line are:

(1) Beam energy
(2) Beam current
(3) Beam distribution
(4) Conveyor speed
(5) Product thickness
(6) Mechanical alignment of the product relative to the beam The last three are parameters of the total setup while the first three are parameters of the electron beam equipment. Of the last there, No. 6 is a property of the conveyor design and, once fixed, should remain so. It can be the subject of routine intermittent inspection. No. 5, the package thickness, will presumably have been determined during the sample runs and controls, and inspection in the packaging will ensure that no overthick product reaches the electron beam processing machine.

The conveyor speed should be constant, and, where production setups call for changes in speed from product to product, this should be accomplished through gears rather than continuously variable speed methods. It is important that the conveyor be free from the phenomenon known as "inching."

If the last three parameters are maintaind correct and the first three or electron beam machine parameters are maintained constant within the permissible margins, then the product will be continuously correctly treated.

As hereinbefore stated, the invention comprehends a concept of monitoring which is that of measuring the electron beam generator parameters and determining whether they deviate from a prescribed margin. If it be assumed that the beam distribution has a constant configuration though not necessarily a constant magnitude (e.g. if it be assumed that a lineally scanned beam has a uniform distribution, or that an unscanned beam has a Gaussian distribution), then the three parameters are: beam current, beam energy and the width of the beam.

As an example, consider a lineally scanned beam and a prescribed margin of 10%. By this is meant that the beam energy is 10% greater than that necessary to penetrate the thickest unit to be sterilized, that the scanned width of the beam is chosen to be 10% greater than the width of the product on the conveyor line, and that after these two are chosen, the current density is 10% higher than that needed to give sterility to the product. A deviation of 10% in any one of the parameters is now permissible, and in the case of current density, providing unwanted side effects do not readily take place, the positive deviation if the other two factors are constant may be greater than 10%. Simultaneous deviation of 10% in two or more of the parameters are, however, not permissible. For example, if the beam energy were to increase by 10% and if the power into the scanning circuit were to decrease by 10%, then the scanned width would in fact decrease by 20%, and the edges of the product line would not be treated. In this case, the permissible deviations in the two parameters are only 5% each or some equivalent combination.

For very short periods, a hundred percent deviation in one or all of the parameters can be tolerated. The extent to which this is possible is dependent upon the conveyor speed, the width of the product being treated, the scanning frequency and the dimension of the beam at the surface of the product in the direction of product travel. This condition could arise for example, if in a microwave linear accelerator arrangement a klystron misfired on one pulse.

These considerations have led to an embodiment of the invention which will now be described in detail with reference to the accompanying drawing, in which:

Fig. 1 is a circuit diagram of an electronic monitor suitable for use with an electrostatic accelerator the electron beam from which is scanned lineally.

Referring to said Fig. 1, there are three channels into which are fed voltage signals derived from the generator voltage, the beam current and the peak oscillatory scanning magnetic field. A generating voltmeter 1 produces an alternating current whose amplitude is proportional to the D.C. voltage of the electrostatic accelerator 2. This alternating current is rectified by a suitable circuit 3 and the resultant direct current, which is proportional to the D.C. voltage of the electrostatic accelerator 2, is fed to ground through a microammeter 4 and an adjustable resistor 5. The total electron beam current produced by the electrostatic accelerator 2 is collected by the Faraday cage 6 and fed to ground through a second microammeter 7 and a second adjustable resistor 8. The oscillatory scanning magnetic field is produced by a pair of scanning coils 9 through which an electric current of triangular waveform is driven by a suitable circuit 10. A signal which is proportional to the peak scanning current is easily derived from the circuit 10 by conventional means, and such signal comprises a direct current which is fed to ground through a milliammeter 11 and a fixed resistor 12. The peak scanning current is, of course, proportional to beam width. As hereinbefore indicated, beam width may be substituted for beam distribution as a parameter only if, in the case of a linear scan, uniformity of scan is assumed; but the circuit 10 of the scanning equipment may easily be so arranged that if any non-linearity takes place, then the amplitude also varies and can be recognized as a fault signal.

The potentials developed by the three currents, proportional to the three parameters, across the adjustable portion of the resistors 5, 8, 12 are backed off by batteries 13, 14, 15, respectively, and the difference signals produced by the operational amplifiers 16, 17, 18 are fed to D.C. amplifiers 19, 20, 21 respectively and combined as required in subsequent operational amplifiers 22, 23, 24, 25, 26, 27. En route to the D.C. amplifiers 19, 20, 21, respectively, the difference signals produced by the operational amplifiers 16, 17, 18 are each fed to an integrating network 28, 29, 30 respectively, so that very short time deviations do not produce a fault signal. If the fault signal produced by any one of the operational amplifiers 19, 20, 21, 22, 23, 24, 25, 26, 27 is of sufficient magnitude to pass current through one of a set of nine diodes 31–39, then a thyratron 40 is fired and a relay 41 is operated. To this relay 41 may be connected fault indicating lights, buzzers or bells, or equipment arranged to mark each incorrectly treated product or to remove it from the production line, such equipment, etc., being indicated diagrammatically at 42.

Very short fault signals are prolonged to two seconds duration by the capacitor 43, which holds the relay 41 in an operated condition for the desired two-second period. This ensures sufficient margin in the fault-indicating apparatus and allows a recorder which indicates the production activity to make a full scale deflection and return.

A pilot light is indicated by the letters "PL" in the circuit of Fig. 1.

In conjunction with this monitoring unit, certain other procedures are recommended.

It has been mentioned previously that the calculations of product thickness and the does required should have been confirmed by sample runs designed to confirm these calculations and to determine the margins required. Next, the machine parameters which this equipment is designed to monitor should also be checked at routine intervals. One practice is to calibrate the beam energy using the photo-disintegration threshold for either beryllium or heavy water. This check is made about once a month. The beam current should be checked. This is relatively simple, since it is only a meter check. The scanned width is checked by placing an indicator against the window of the electron beam and physically measuring the width of the beam.

An important operational check is the inclusion in the product run of packages of indicator material which can, of course, be destructively analyzed. For example, one may use blocks made of thin sheets of polymethylmethacrylate, the degradation in which has been measured by the intrinsic viscosity method. This shows not only the dose but also the penetration and the width and uniformity of the scan. Another possibility is the use of the ultra-violet absorption characteristic of this same material.

Finally, it may be deemed advisable to include with each irradiated unit its own permanent chemical or physical dosimeter which is only to be read on an "as required" basis. These samples could be taken from the production line or from plant and warehouse stocks and, if necessary, from sttocks already distributed. The requirements of such dosimeter are that it be relatively small and inexpensive compared with the cost per unit of the radiation and that it be a permanent record of the dose received. Since only in rare circumstances will the indicator be analyzed, relatively time-consuming and complex methods in determining the dose are permissible. It is possible that the same material, or perhaps something similar, whose original composition can be closely controlled and whose degradation or other chemical or physical change has a definite relationship with dose, can be used.

In electron beam processing there exists the need, as in many other fields, for systems engineering. Even if the perfect indicator material were available today, a material having simultaneous properties of permanency, easy readability, and inexpensiveness, we would have some difficulty in integrating it economically with the high power electron processing machines which are now on sale. In accordance with the invention, methods are used which, although at first sight they appear to be indirect in that they do not measure the dose supplied to the product under treatment, do in fact more directly answer the question to which the processor demands an answer, namely: "Is the product being correctly treated?"

Having thus described the method of the invention together with a preferred embodiment of apparatus for carrying out the method, it is to be understood that although specific terms are employed, they are used in a generic and descriptive sense and not for purposes of limitation, the scope of the invention being set forth in the following claims.

I claim:

1. Apparatus for monitoring the dosage produced in matter being irradiated with electrons, comprising in combination: means for producing a beam of electrons, means for directing said beam onto the matter to be irradiated, means to develop a signal whenever the energy of the electrons in said beam falls below a predetermined value, means to develop a signal whenever the beam current falls below a predetermined value, and means to develop a signal whenever the cross-sectional distribution of the beam of electrons deviates by more than a predetermined amount from a predetermined pattern.

2. Apparatus for monitoring the dosage produced in matter being irradiated with electrons, comprising in combination: means for producing a beam of electrons having a distribution of substantially constant configuration though not necessarily of constant magnitude, means for directing said beam onto the matter to be irradiated, means to develop a signal whenever the energy of the electrons in the beam falls below a predetermined value, means to develop a signal whenever the beam current falls below a predetermined value, means to develop a signal whenever the width of the beam falls below a predetermined value, means to develop a signal whenever the sum of (1) the amount by which the beam current falls below a predetermined value plus (2) the amount by which the beam width exceeds a predetermined value exceeds a predetermined value, and means to develop a signal whenever the beam width exceeds a predetermined value.

3. Apparatus for monitoring the dosage produced in matter being irradiated with electrons comprising in combination: means for producing a continuous substantially monoenergetic beam of electrons, means for converting a lineally oscillatory current into a lineally oscillatory magnetic field in the path of said beam, whereby a linear scanning movement is imparted to said beam, means for conveying said matter through said beam, and an analogue computer using three parameters related to beam current, beam energy, and scan current, respectively, to develop a signal whenever any one of the following quantities exceeds a predetermined amount: (1) beam energy increase, (2) beam energy decrease, (3) beam current decrease, (4) scan current increase, (5) scan current decrease, (6) the sum of beam energy decrease plus beam current decrease, (7) the sum of beam energy decrease plus scan current increase, (8) the sum of beam energy increase plus scan current decrease, (9) the sum of beam current decrease plus scan current increase.

4. Apparatus for monitoring the dosage produced in matter being irradiated with electrons comprising in combination: means for producing a beam of electrons, means for conveying said matter through said beam, and an analogue computer using three parameters related to beam current, beam energy, and beam distribution, respectively, to develop a signal whenever a set of circumstances arise which cause undertreatment of said matter in response to deviations of said parameter from pre-determined norms in excess of pre-determined mounts, wherein said analogue computer includes means for prolonging very short fault signals so that they may be easily observed.

5. Apparatus in accordance with claim 3, wherein said analogue computer includes means to prevent development of a signal despite an error in any or all of the nine listed quantities lasting less than a predetermined time interval.

6. Apparatus for monitoring the dosage produced in matter being irradiated with electrons comprising in combination: means for producing a continuous substantially monoenergetic beam of electrons, means for converting a lineally oscillatory voltage into a lineally oscillatory electric field in the path of said beam, whereby a linear scanning movement is imparted to said beam, means for conveying said matter through said beam, and an analogue computer using three parameters related to beam current, beam energy, and scan voltage, respectively, to develop a signal whenever any one of the following quantities exceeds a predetermined amount: (1) beam energy increase, (2) beam energy decrease, (3) beam current decrease, (4) scan voltage increase, (5) scan voltage decrease, (6) the sum of beam energy decrease plus beam current decrease, (7) the sum of beam energy decrease plus scan voltage increase, (8) the sum of beam energy increase plus scan voltage decrease, (9) the sum of beam current decrease plus scan voltage increase.

References Cited in the file of this patent
UNITED STATES PATENTS

| | | |
|---|---|---|
| 2,429,217 | Brasch | Oct. 21, 1947 |
| 2,602,751 | Robinson | July 8, 1952 |
| 2,680,815 | Burrill | June 8, 1954 |
| 2,729,748 | Robinson | Jan. 3, 1956 |
| 2,741,719 | Reed | Apr. 10, 1956 |
| 2,769,096 | Frey | Oct. 30, 1956 |
| 2,814,730 | Fechter | Nov. 26, 1957 |